Jan. 23, 1934.                    C. W. FLOSS                    1,944,685
                        POWER TRANSMITTING UNIT FOR VEHICLES
                            Filed May 19, 1930         5 Sheets-Sheet 1

INVENTOR
Carl W. Floss.
BY Whittemore Hulbert
Whittemore & Belknap
ATTORNEY

Jan. 23, 1934.   C. W. FLOSS   1,944,685
POWER TRANSMITTING UNIT FOR VEHICLES
Filed May 19, 1930    5 Sheets-Sheet 3

INVENTOR
Carl W. Floss.
BY
ATTORNEY

Jan. 23, 1934.  C. W. FLOSS  1,944,685
POWER TRANSMITTING UNIT FOR VEHICLES
Filed May 19, 1930   5 Sheets-Sheet 4

INVENTOR
Carl W. Floss.
BY Whittemore Hulbert
Whittemore & Belknap
ATTORNEY

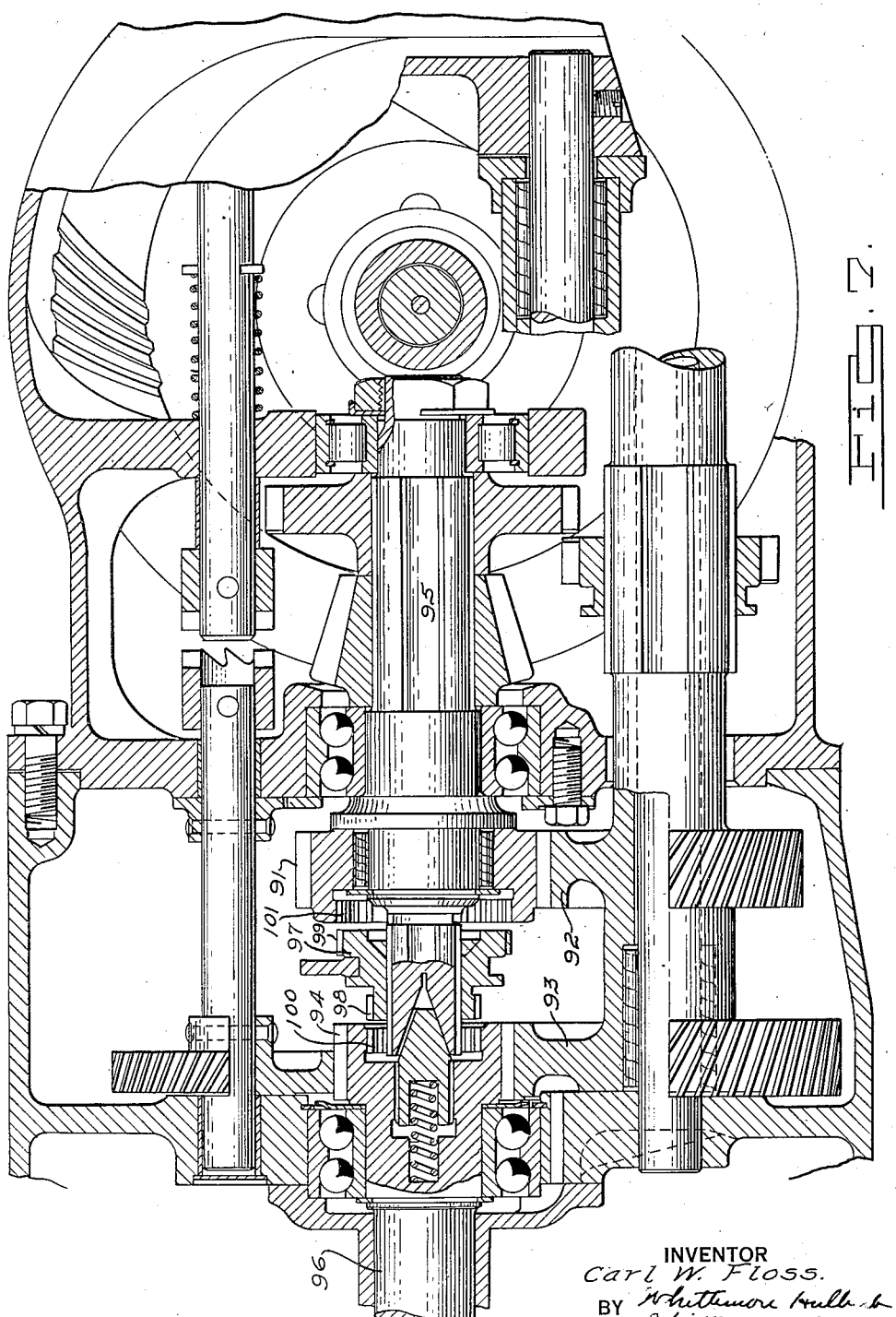

Patented Jan. 23, 1934

1,944,685

UNITED STATES PATENT OFFICE 1,944,685

POWER TRANSMITTING UNIT FOR VEHICLES

Carl W. Floss, Detroit, Mich.

Application May 19, 1930. Serial No. 453,745

10 Claims. (Cl. 74—57)

This invention relates generally to front wheel drive vehicles and more particularly to improved means for transmitting power from the engine of the vehicle to the drive wheels thereof.

While front wheel drive vehicles have achieved considerable recognition in the trade as possessing many advantageous features over the conventional rear drive systems, nevertheless, there are several distinct objections to front wheel drive vehicles as now commercially produced. One of the most predominant objections to the front wheel drive principle is that it is not adaptable to vehicles having a relatively small wheel base owing to the abnormal space required between the driver's compartment and front axle assembly necessary to accommodate the engine, clutch, variable speed transmission and differential gearing. In addition to the above, front wheel drive systems are inclined to be extremely complicated in design and difficult to service due to the inaccessibility of the parts involved and in most instances prove costly to manufacture on a production basis.

The present invention contemplates eliminating the foregoing objections by appreciably reducing the over-all dimension of the power unit permitting a corresponding reduction in the space required between the driver's compartment of the vehicle and the front axle thereof and also by simplifying generally the construction of the several parts involved and rendering the parts more accessible with the result that the cost of manufacture is not only materially reduced but adjustment and replacement of the parts facilitated. Moreover, by reducing the over-all dimension of the power unit, the engine may be located in closer proximity to the drive wheels with the result that a relatively large percentage of the weight thereof is supported directly by the drive wheels, thereby increasing the traction of the vehicle and enhancing the riding qualities thereof.

With the foregoing as well as other objects in view the invention resides not only in the novel details of construction, but also in the peculiar arrangement of parts which permits reducing the over-all dimension of the unit. The foregoing will be made more apparent as this description proceeds, especially when considered in connection with the accompanying drawings, wherein:

Figure 7 is a longitudinal sectional view through a modified form of construction.

Figure 1:
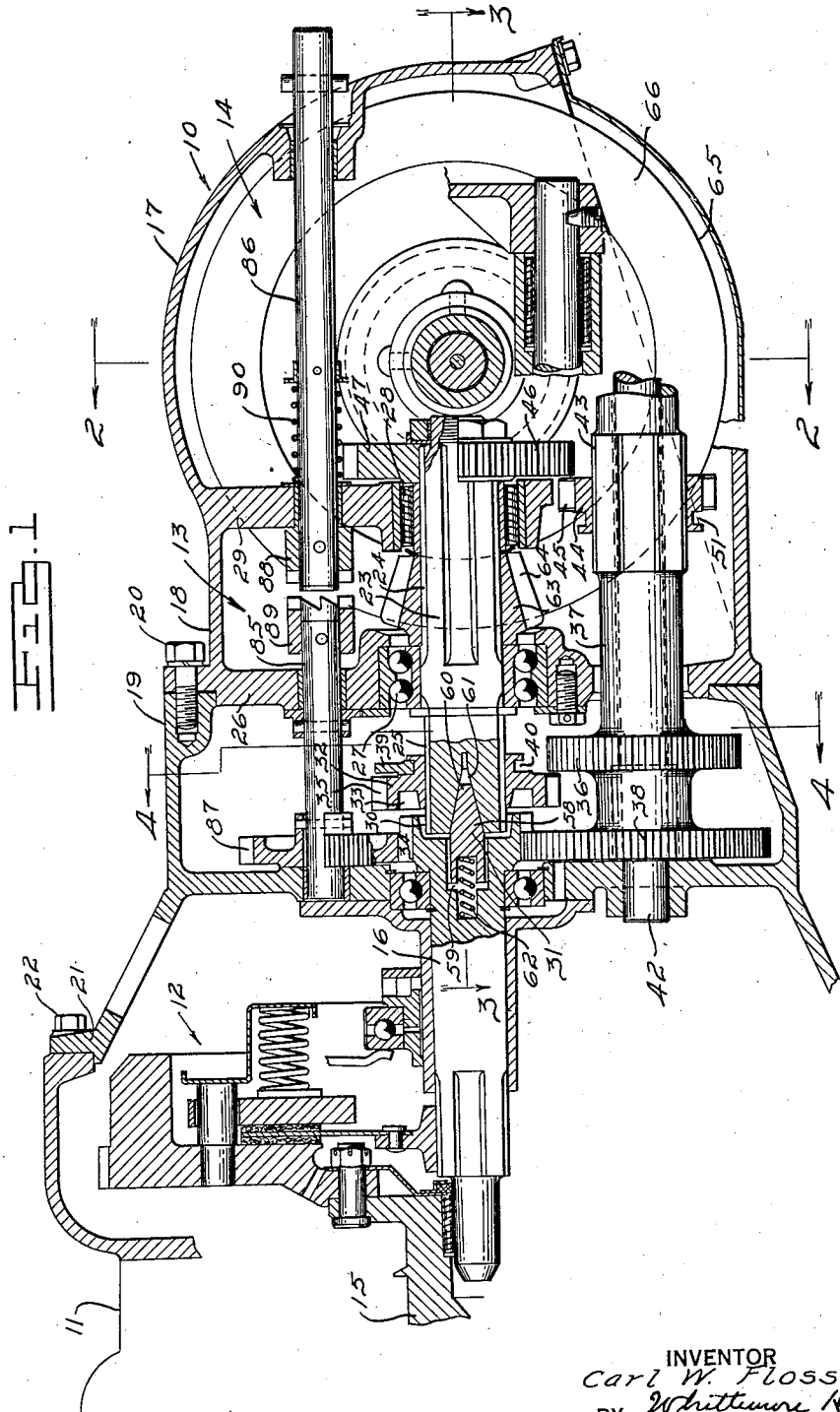
Figure 1 is a longitudinal sectional view through a power unit constructed and arranged in accordance with this invention.

Referring now to the drawings, it will be noted that there is illustrated in Figure 1 a power transmitting unit 10 especially designed for front wheel drive vehicles and adapted to be supported by a chassis frame (not shown) in advance of the engine 11 which is preferably of the conventional multi-cylinder internal combustion type. The power transmitting unit 10 comprises generally a clutch 12, a variable speed transmission 13 and differential drive mechanism 14. The clutch 12 may be of any conventional design suitable for operatively connecting the drive shaft 15 of the engine with the power or clutch shaft 16, while the variable speed transmission is preferably of the selective gear type and is operatively connected to the differential gearing for driving the latter from the power shaft 16 at different speeds. The differential mechanism 14, selected for the purpose of illustration, is of the conventional ring and pinion type adapted to drive the front wheels of the vehicle in a manner to be more fully hereinafter set forth.

As previously stated, one of the principal objects of the invention is to reduce the over-all dimension of the power unit 10 and thereby minimize the space necessary for accommodating this unit. The invention contemplates economizing on space as well as material and parts by overlapping portions of the differential gearing 14 and transmission and providing a common housing 17 for the differential gearing and transmission. The housing 17 is preferably formed of two parts 18 and 19 detachably secured together by means of a series of bolts 20 so arranged as to be readily accessible to facilitate assembly. The part 19 of the housing 17 extends rearwardly beyond the transmission proper and is provided with a radial flange 21 adapted to be detachably secured to the forward end of the clutch housing by means of a series of bolts 22.

For the purpose of illustration, the transmission shown herein is of the three speed selective type and comprises a transmission shaft 23 supported co-axially with the power shaft 16 and having axially extending spaced splines 24 and 25 formed on the front and rear end portions respectively thereof. The shaft 23 is supported intermediate the ends within the rear end wall 26 of the section 18 of the housing by a suitable thrust bearing 27 engaging the portion of the shaft intermediate the splines and is further supported at the forward end thereof by means of a roller bearing 28 carried by a web 29 formed integral with and extending inwardly from the housing 17 intermediate the ends thereof. Thus, it will be observed that the forward end of the transmission shaft 23 terminates at a point intermediate the ends of the housing 17 so as to provide sufficient space for the equalizing or differential mechanism to be presently described. The rear end portion of the transmission shaft 23 on the other hand extends within a recess 30 in the forward end of the power shaft 16, but is not journaled therein as is the usual practice since the thrust bearing 27 and roller bearing 28 owing to their close proximity to each other form an ample support for the shaft. By eliminating the usual bearing for the transmission shaft within the end of the power shaft, a saving in cost of manufacture is not only effected but the installation of a relatively simple synchronizing device designated generally by the reference character 31 is permitted. The mode of operation of the synchronizing device and the manner in which the same is installed will be more fully hereinafter set forth.

In order to directly connect the power shaft 16 and transmission shaft 23, I provide a suitable gear 32 slidably mounted upon the splines 25 and having an interior annular set of teeth 33 adapted to mesh with corresponding teeth 34 on the forward end of the power shaft 16. The gear 32 is further provided with an annular outer set of teeth 35 operable in one position of the gear 32 to mesh with a cooperating gear 36 secured to the counter-shaft 37 which is constantly driven from the power shaft 16 by a gear 38 secured to the rear end of the counter-shaft within the housing section 19 and meshing with the teeth 34 on the power shaft. The foregoing arrangement is such that movement of the gear 32 rearwardly engages the cooperating teeth 33 and 34 to directly drive the transmission shaft 23 from the power shaft 16; while movement of the gear 32 forwardly effects an engagement of the teeth 35 on the latter gear with the cooperating teeth on the gear 36 to indirectly connect the power shaft with the transmission shaft for effecting rotation of the latter at a different speed. The gear 32 is preferably actuated in accordance with the usual practice by a suitable shifting fork 39 having one end engaging in a recess 40 formed in the gear and the opposite end operatively connected to the sliding rail 41 which in turn is connected to the gear shift lever (not shown).

The counter-shaft 37 preferably extends longitudinally of the casing 17 across the differential mechanism 14 and is journaled upon a suitable shaft 42 having the opposite ends thereof secured within the front and rear walls of the casing 17. As shown particularly in Figure 1, the counter-shaft is splined as at 43 intermediate the ends thereof for slidably receiving a suitable gear 44 which, for the purpose of illustration, will be referred to hereinafter as a low speed gear. The low speed gear 44 is provided with a series of annular teeth 45 operable in one position of the gear to engage corresponding teeth 46 formed on the cooperating low speed gear 47. The gear 47 is secured to the splines 24 on the shaft 23 immediately in front of the roller bearing 28 and when driven by the gear 44, effects rotation of the shaft 23 at a relatively slow rate of speed. The gear 44 is moved upon the splines 43 into and out of engagement with the gear 47 by means of a shifter fork 48 pivotally mounted intermediate the ends thereof as at 49 and having the lower end 50 engaging within a suitable recess 51 formed in the gear 44. The upper end 52 of the shifter fork 48 is secured to a suitable shifter rail 53 also adapted to be operated by the usual gear shifting lever above referred to and not shown herein. The foregoing construction is such that movement of the shifter rail 53 axially in one direction effects an axial movement of the gear 44 in the opposite direction to either engage or dis-engage the gears 44 and 47 depending upon the direction of movement of the rail.

Figure 3:
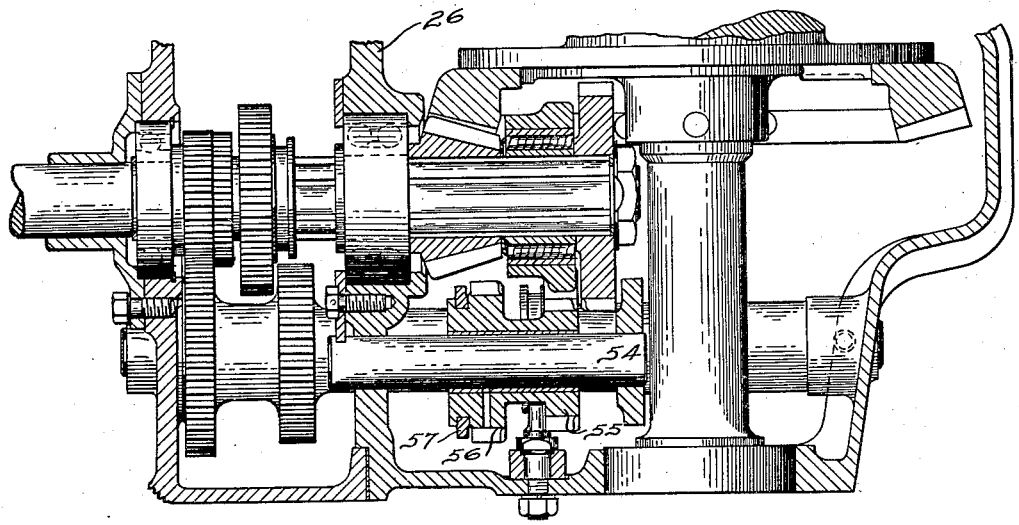
Figure 3 is a sectional view taken substantially on the line 3—3 of Figure 1.
Figure 4:
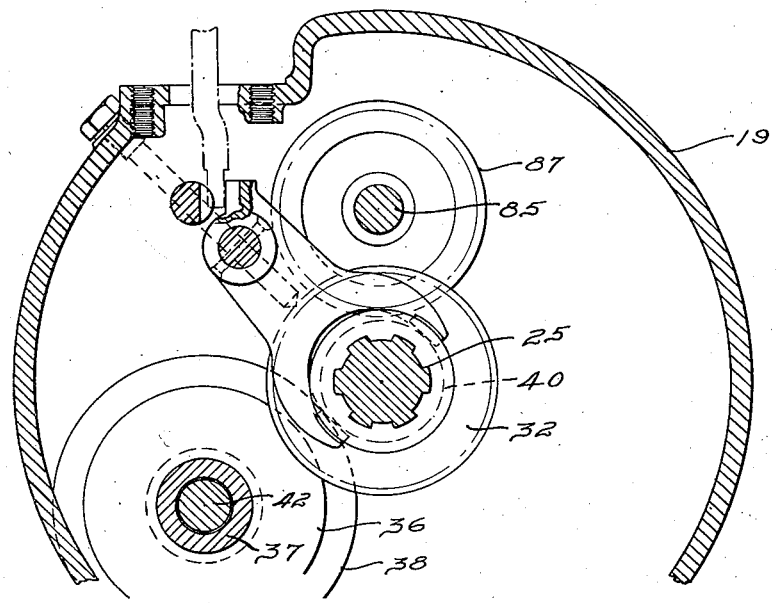
Figure 4 is a sectional view taken substantially on the line 4—4 of Figure 1.
Figure 5:
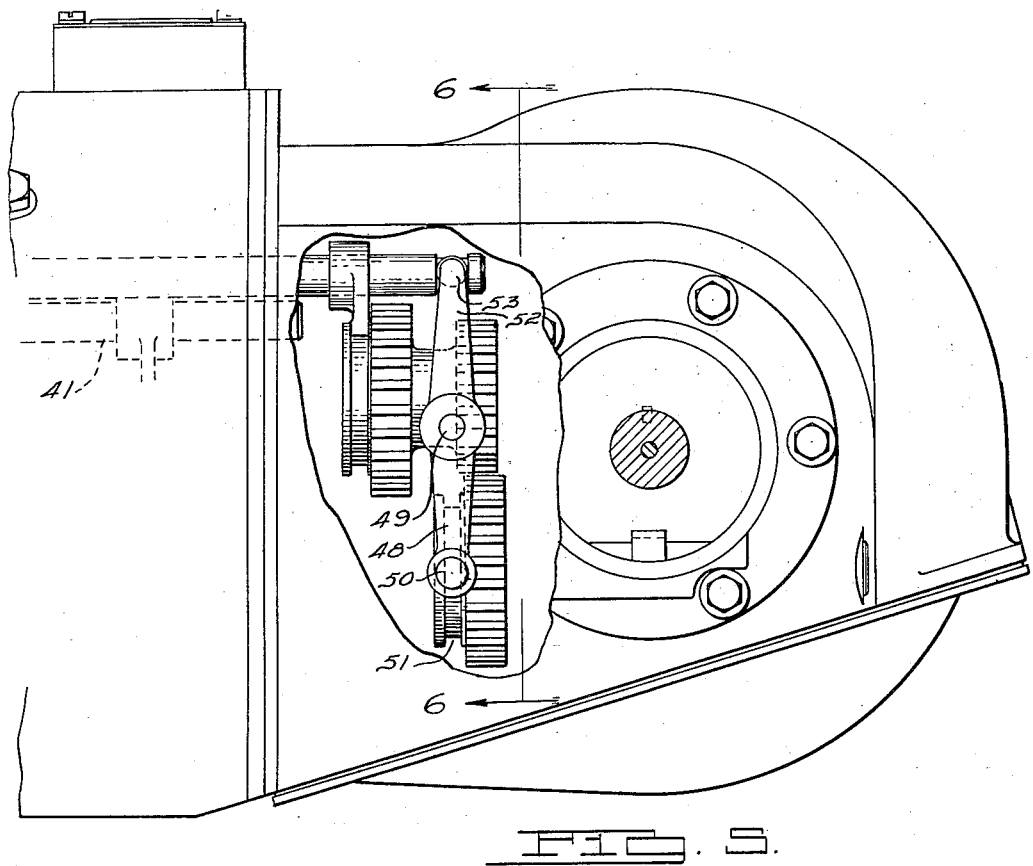
Figure 5 is a side elevational view partly in section of the construction shown in Figure 1.
Figure 6:
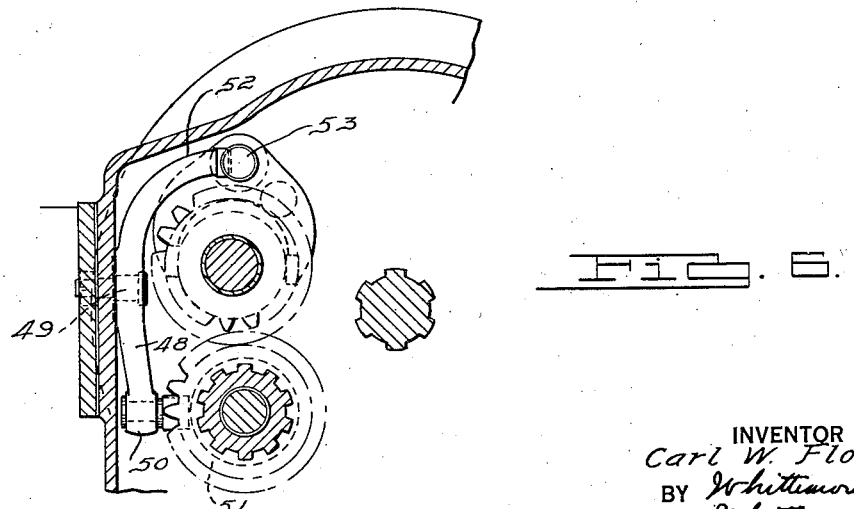
Figure 6 is a sectional view taken substantially on the line 6—6 of Figure 5.

In order to drive the transmission shaft 23 in the opposite direction from the power shaft 16, I provide an idler shaft 54 located to one side of the transmission shaft 23 as clearly shown in Figure 3 of the drawings, and having the opposite ends thereof secured respectively in the end wall 26 of the section 18 and in the web 29. Slidably mounted as a unit upon the shaft 54 is a pair of axially spaced gears 55 and 56. The space between the gears 55 and 56 is so selected that when the parts above described are in a predetermined position, the gear 55 meshes with the low speed gear 47 and the gear 56 meshes with the low speed gear 44. In order to move the parts to the aforesaid predetermined position to effect an engagement of the above-mentioned gears, a third shifter fork 57 is provided having one end operatively engaging the gears 55 and 56 for moving the latter and having the opposite end connected to the shifter rail 53 as shown in Figure 6 of the drawings. The foregoing construction is such that when the shifter rail 53 is in its normal or neutral position, the idler reverse gears 55 and 56 are out of mesh with both of the gears 44 and 47 with the result that the reverse gearing does not revolve when not in use thereby eliminating noise and wear of the parts.

With the construction as thus far described, it will be observed that movement of the shifter rail 53 in one direction causes the gears 55 and 56 to move in a corresponding direction as distinguished from the low speed gear 44 which owing to its connection with the shifter rail 53, as specified above, causes the gear 44 to move in an opposite direction to the direction of movement of the rail set forth above. In detail, when the shifter rail 53 is moved axially rearwardly from the position shown in Figure 1, the shifter fork 48 functions to move the low speed gear 44 forwardly into engagement with the cooperating gear 47. As the low speed gear 44 is being moved forwardly by the shifter fork 48, the shifter fork 57 operates to move the idler gears 55 and 56 rearwardly or in a direction corresponding to the direction of movement of the rail 53 which, as previously stated, is opposite to the direction of movement of the gear 44. Thus, it will be seen that movement of the rail 53 in a direction to mesh the gears 44 and 47 effects a movement of the idler gears 55 and 56 away from the low speed gears. On the other hand, when the shifter rail 53 is moved forwardly from the position shown in Figure 1, the idler gears 55 and 56 are moved forwardly as a unit and the low speed gear 44 is moved rearwardly. This movement continues until the gear 55 meshes with the low speed gear 47 and the gear 56 meshes with the low speed gear 44. If desired, the gears just described can be so arranged that one gear engages its cooperating gear slightly ahead of the other pair of gears so as to facilitate meshing of the gears. By reason of the foregoing construction, it will be observed that only two shifter rails are necessary in the transmission since both the low and reverse speed shifter members are actuated by a single shifter rail.

Referring now more in detail to the synchronizing device 31, it will be noted that this device is of simple design and comprises a member 58 having a portion slidably and non-rotatably mounted within a recess 59 formed in the front end of the power shaft 16 and having a frusto-conical portion 60 normally urged into frictional engagement with a correspondingly shaped recess 61 formed in the rear end of the transmission shaft 23, by a suitable coil spring 62. By reason of the above construction, shifting of the gears is greatly facilitated since the synchronizing device controls to some extent the relative rotation of the shaft 16, counter-shaft and transmission shaft.

Thus, from the foregoing it will be observed that I have provided a transmission assembly wherein only one slidable gear is mounted upon the transmission shaft thereby permitting a reduction in the over-all length of the shaft with a corresponding reduction in bearing surface area. As stated above, with my improved construction it is not essential to provide a bearing within the end of the power shaft for the corresponding end of the transmission shaft thereby not only facilitating the assembly of a synchronizing device of the type specified above within the end of the power shaft, but also reducing the number of parts of the transmission. In this connection it is to be noted, however, that my improved synchronizing device may be used with slight modification within the conventional type of transmission wherein one end of the spline shaft is journaled within the adjacent end of the clutch or power shaft.

Figure 2:
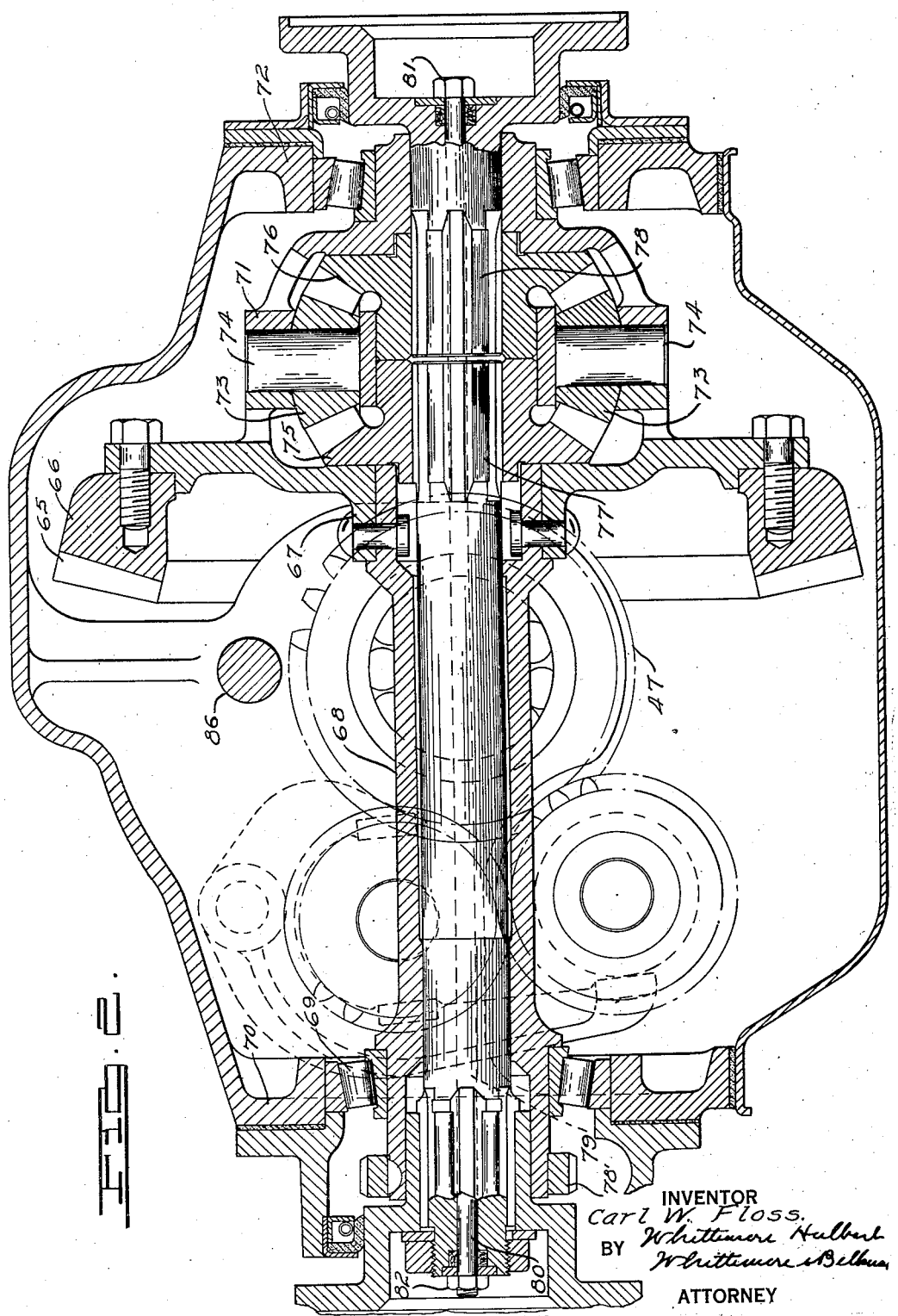
Figure 2 is a sectional view taken substantially on the line 2—2 of Figure 1.

As previously stated, in order to reduce the over-all dimension of the power unit 10 and to effect economy in manufacture, the differential drive mechanism 14 is located within the section 17 of the housing in overlapping relation with the transmission. In detail, the differential mechanism 14 comprises a pinion 63 secured by the splines 24 on the transmission shaft 23 intermediate the thrust bearing 27 and low speed gear 47 and having tapered teeth 64 adapted to mesh with corresponding teeth 65 on the ring gear 66. The ring gear 66 is secured as at 67 to the inner end of a tubular shaft 68 having the outer end portions thereof journaled in a suitable thrust bearing 69 carried by the side wall 70 of the casing 17. As shown particularly in Figure 2, the ring gear is provided with a central hub section 71 having the extreme outer end portion journaled within the opposite side wall 72 of the casing and having a body portion 72' carrying a plurality of pinions 73 journaled upon a corresponding number of shafts 74 extending radially of the ring gear and anchored in the body portion aforesaid. The pinions 73 are adapted to mesh with a pair of co-axially extending pinions 75 and 76 splined on the inner ends of the axles 77 and 78, respectively. The axles 77 and 78 are arranged co-axially with each other and have the inner ends thereof spaced from each other and the outer ends projecting through the side walls 70 and 72 of the casing for detachable connection with suitable coupling members which are adapted to be connected to the front wheels 80 of the vehicle. The above construction is such as to permit differential movements of the axles 77 and 78 in accordance with the usual practice. As will be observed from Figure 2 of the drawings, the shaft 77 extends through the tubular shaft 68 in co-axial relation thereto and the coupling member on the outer end of the shaft 77 is journaled within the enlarged outer end 77' of the tubular shaft 68. In this connection it is to be noted from the above figure that the usual speedometer drive gear 78' is secured to the outer end of the shaft 68 so as not to interfere with removal of the shaft 77.

For securing the axles 77 and 78 in assembled relation, the latter are provided with co-axially extending bores 79 for receiving a tie rod 80. The tie rod 80 is of one-piece construction and extends through both of the axles 77 and 78 and is provided with a head portion 81 at one end engaging the outer end of the axle 78 and a threaded portion at the opposite end for receiving the clamping nut 82. The arrangement is such that the axles 77 and 78 may be readily secured within the assembly or removed from the latter by merely manipulating the clamping bolt 82 and removing the rod. The above operation may be performed from points exteriorly of the casing and accordingly may be accomplished with facility.

In order to provide for manually cranking the engine to start the same, I provide a pair of co-axially extending shafts 85 and 86 journaled within the housing 17 as clearly shown in Figure 1 of the drawings. From the above figure it will be observed that the shaft 85 is provided with a gear 87 arranged in constant mesh with the teeth 34 on the end of the clutch shaft 16. The arrangement is such that rotation of the shaft 85 effects a corresponding rotation of the engine shaft 15 through the gearing and power shaft 16 specified above. The shaft 86 is mounted for limited axial movement within the housing 17 and has secured to the inner end thereof a clutch part 88 adapted to mesh with a corresponding clutch part 89 secured to the inner end of the shaft 85. The outer end of the shaft 86 extends through the front wall of the casing 17 for receiving a suitable crank (not shown). The arrangement is such that when it is desired to manually crank the engine, the shaft 86 is moved inwardly against the action of the spring 90 to engage the clutch parts 88 and 89. After the above clutch parts have been engaged, the shaft 86 is turned by means of a crank to effect a rotation of the shaft 85 which in turn rotates the engine shaft in the manner outlined above. From the foregoing it will be observed that both the shafts 85 and 86 constitute a permanent part of the assembly and are so arranged within the housing as not to interfere with the operation of the transmission or differential mechanism.

The modified form of power unit illustrated in Figure 7 is substantially the same as the power unit hereinbefore described with the exception that the intermediate speed gears 91 and 92 are arranged in constant mesh and like the constant meshing countershaft drive gear 93 and cooperating power shaft gear 94 are of the helical spur type. By reason of the provision of helical spur gears in constant mesh, as specified above, the operation of the transmission is rendered relatively silent in second speed and shifting of the gears from one speed to the other is greatly facilitated.

In order to actuate the transmission shaft 95 either directly from the power shaft 96 or indirectly therefrom at an intermediate speed, I provide a clutch 97 slidably and non-rotatably mounted upon the transmission shaft 95 between the intermediate speed gear 91 which is freely rotatably mounted upon the transmission shaft and the power shaft gear 94. The clutch member 97 is provided with axially spaced teeth 98 and 99 operable in one position of the clutch to directly drive the transmission shaft 95 from the power shaft 96 and in another position of the clutch to secure the gear 91 to the transmission shaft 95 and thereby effect rotation of the latter at an intermediate speed. In detail, shifting of the clutch 97 rearwardly effects an engagement of the clutch teeth 98 with the internal teeth 100 formed upon the gear 94 to directly connect the transmission 95 with the power shaft 96. On the other hand, movement of the clutch forwardly effects an engagement of the teeth 99 with cooperating internal teeth 101 formed upon the helical spur gear 91 to secure the latter to the transmission shaft and thereby drive the latter through the gears 94, 93 and 92 at an intermediate speed. As will be apparent from Figure 7, low and reverse speeds are obtained in the same manner as in the first-described form of the invention and accordingly further description of the same will not be given at this point. The hand starting mechanism is also similar in operation to the construction defined in connection with the above-described form of the invention with the exception that the gear meshing with the power shaft gear 94 is of the helical spur type corresponding with the gear 94.

From the foregoing it will be observed that I have provided a variable speed transmission and differential drive mechanism wherein the counter-shaft and a portion of the transmission shaft overlap the differential drive gearing permitting both the aforesaid units to be compactly assembled within a single casing. It will also be apparent from the above description that a material saving in cost of manufacture is effected owing to the comparatively few number of parts involved and servicing of the power unit is facilitated due to the accessibility of the parts.

While two embodiments of the invention have been referred to herein somewhat in detail, it should be understood that various changes may be made in the construction and arrangements of parts of the power unit without departing from the spirit and scope of this invention and accordingly reservation is made to make such changes as may come within the purview of the accompanying claims.

What I claim as my invention is:

1. A power transmitting unit for vehicles comprising a variable speed transmission including a drive shaft and a pair of axially spaced bearings for supporting said drive shaft, differential drive mechanism including a ring gear having its axis of rotation spaced beyond the end of said drive shaft and extending transversely thereof, a gear mounted upon the drive shaft intermediate the bearings aforesaid and meshing with said ring gear for driving the latter, and a change speed gear for said transmission opposite the face of the ring gear and mounted upon said drive shaft beyond the bearings therefor.

2. A power transmitting unit for vehicles comprising a variable speed transmission having a plurality of shafts, a gear slidably mounted upon one of said shafts and adapted to mesh with a second gear fixed upon another of said shafts, a pair of gears slidably mounted on still another of said shafts in axial spaced relation to each other and adapted to mesh with said first and second-mentioned gears, a single actuating member for operating the gears, and means connecting said actuating member to the slidable gears aforesaid operable upon movement of the member in one direction to move said first-mentioned gear into mesh with the second gear and upon movement of the said member in another direction to move said first-mentioned gear out of engagement with said second gear and to move one of the pair of gears aforesaid into engagement with the second gear and the other of said pair of gears into engagement with the first-mentioned gear.

3. A power transmitting unit for vehicles comprising a variable speed transmission having a plurality of shafts, a gear slidably mounted upon one of said shafts and adapted to mesh with a corresponding gear upon another of said shafts, a pair of gears slidable as a unit upon still another of said shafts and adapted to mesh with the first and second-mentioned gears aforesaid, and means for simultaneously actuating said first-mentioned gear and said pair of gears in opposite directions whereby movement of said gears to one position causes the first-mentioned gear to mesh with the second gear to drive the latter in one direction and movement of said gears to another position effects an engagement of said pair of gears respectively with the first and second-mentioned gears to drive the latter gear in an opposite direction.

4. A power transmitting unit for vehicles comprising a variable speed transmission having a drive gear and a shiftable gear adapted to be moved into mesh with the drive gear for actuating the same in one direction, reverse idler gearing including a pair of axially spaced gears slidably mounted as a unit within the transmission and adapted to mesh with the drive gear and shiftable gear for operating the drive gear in a reverse direction, and means for simultaneously moving said reverse idler gears and shiftable gear in opposite directions.

5. A power transmitting unit for vehicles comprising, a variable speed transmission having a plurality of shafts, a gear slidably mounted upon one of the shafts and adapted to mesh with a corresponding gear upon another of said shafts, a pair of gears slidable as a unit upon still another of said shafts and adapted to mesh with the first and second mentioned gears aforesaid, and common means for actuating both of said slidable gears to effect selective meshing of the gears aforesaid.

6. A power transmitting unit for vehicles comprising, a variable speed transmission having a plurality of shafts, a gear slidably mounted upon one of the shafts and adapted to mesh with a corresponding gear upon another of said shafts to effect rotation of the latter shaft in one direction, a pair of gears slidable as a unit upon still another of said shafts and adapted to mesh with the first and second mentioned gears aforesaid to effect rotation of the second mentioned shaft in a reverse direction, and common means for simultaneously actuating said first mentioned gear and said pair of gears in opposite directions to effect selective meshing of the gears.

7. A power transmitting unit for vehicles, comprising a housing formed of readily separable sections, differential drive mechanism including a ring gear located within and supported by one of said sections, a variable speed transmission mechanism having a drive shaft journaled within said section, a pinion meshing with the ring gear and mounted upon the drive shaft whereby both the pinion and ring gear are supported by the same section, and low speed gearing forming a part of the variable speed transmission positioned opposite the face of the ring gear.

8. A power transmitting unit for vehicles, comprising a housing formed of a plurality of readily separable sections, differential drive mechanism including a ring gear located within and supported by one of said sections, variable speed transmission mechanism comprising a drive shaft journaled within the aforesaid section in overlapping relation with the ring gear and having a low speed gear mounted thereon opposite the face of the ring gear, and a pinion meshing with the ring gear and mounted upon the drive shaft whereby both the pinion and gear are supported by one of said sections.

9. A power transmitting unit for vehicles, comprising a housing formed of readily separable sections, differential drive mechanism including a ring gear located within and supported by one of said sections, a variable speed transmission mechanism comprising a drive shaft extending in overlapping relation with respect to the ring gear and having a change speed gear mounted thereon opposite the face of the ring gear, means for journaling the drive shaft in the section aforesaid of the housing including a pair of journals fixed to said section in spaced relation axially of the drive shaft and a pinion fixed to the drive shaft between the aforesaid journals and meshing with the ring gear.

10. A power transmitting unit for vehicles, comprising a housing formed of a plurality of readily separable sections, differential drive mechanism including a ring gear located within and supported by one of said sections, variable speed transmission mechanism comprising a drive shaft journaled within the aforesaid section in overlapping relation with the ring gear and having a change speed gear mounted thereon opposite the face of said ring gear and a pinion meshing with the ring gear and mounted upon the drive shaft whereby both the pinion and ring gear are supported in the same section.

CARL W. FLOSS.